United States Patent
Garcia

(10) Patent No.: US 9,103,317 B2
(45) Date of Patent: Aug. 11, 2015

(54) WIND OPERATED ELECTRICITY GENERATING SYSTEM

(71) Applicant: Rafael Garcia, Stockton, CA (US)

(72) Inventor: Rafael Garcia, Stockton, CA (US)

(*) Notice: Subject to any disclaimer, the term of this patent is extended or adjusted under 35 U.S.C. 154(b) by 533 days.

(21) Appl. No.: 13/659,402

(22) Filed: Oct. 24, 2012

(65) Prior Publication Data

US 2013/0127393 A1   May 23, 2013

Related U.S. Application Data

(60) Provisional application No. 61/561,775, filed on Nov. 18, 2011.

(51) Int. Cl.
| | |
|---|---|
| *H02J 7/00* | (2006.01) |
| *F03D 9/00* | (2006.01) |
| *F03D 3/00* | (2006.01) |
| *H02J 7/14* | (2006.01) |

(52) U.S. Cl.
CPC *F03D 9/00* (2013.01); *F03D 3/002* (2013.01); *H02J 7/1415* (2013.01); *F05B 2240/941* (2013.01); *Y02E 10/74* (2013.01); *Y02T 10/7005* (2013.01)

(58) Field of Classification Search
USPC ......................................................... 320/101
See application file for complete search history.

(56) References Cited

U.S. PATENT DOCUMENTS

| | | | |
|---|---|---|---|
| 3,910,623 A | 10/1975 | McKeen | |
| 3,934,923 A | 1/1976 | Lissaman | |
| 4,006,931 A | 2/1977 | Groves | |
| 4,022,508 A | 5/1977 | Kirsch | |
| 4,102,548 A | 7/1978 | Kangas | |
| 4,437,698 A | 3/1984 | Tantalo | |
| 6,674,263 B2 * | 1/2004 | Agbossou et al. | 320/101 |
| 6,882,059 B1 * | 4/2005 | DePaoli | 290/44 |
| 7,336,002 B2 * | 2/2008 | Kato et al. | 307/10.6 |
| 8,710,789 B2 * | 4/2014 | Mardirossian | 320/101 |
| 2009/0211826 A1 * | 8/2009 | Hashimoto | 180/65.275 |
| 2010/0065349 A1 * | 3/2010 | Ichikawa et al. | 180/65.1 |

* cited by examiner

*Primary Examiner* — Yalkew Fantu

(57) ABSTRACT

A wind operated electricity generating system for decreasing wind resistance of a moving vehicle and harvesting energy from the air encountered, comprises a box portion having a front opening, a rear opening and an inside compartment. When a vehicle is moving, air is funneled through the increasingly narrow inside compartment. The air is directed through a series of vanes to a plurality of blade of a multiple turbines that are thereby caused to rotate. The turbines are in turn mechanically connected to electromechanical generators, which generate electricity to be supplied to the vehicle. The electricity generated is stored in battery packs that may be utilized for propulsion of the vehicle. The electromechanical generator speed is controlled under a safe rotational speed by a braking mechanism attached to a shaft of the electromechanical generator.

19 Claims, 13 Drawing Sheets

WIND OPERATED ELECTRICITY GENERATING SYSTEM

RELATED APPLICATIONS

This application claims priority from the U.S. provisional application with Ser. No. 61/561,775, which was filed on Nov. 18, 2011. The disclosure of that provisional application is incorporated herein as if set out in full.

BACKGROUND OF THE INVENTION

1. Technical Field of the Invention

The present invention relates to fuel efficiency improvements in vehicles, and in particular to a system for capturing energy from air friction encountered by a moving vehicle or other moving object.

2. Description of the Related Art

From the time the automobile was invented, entrepreneurs have been attempting to increase its range, decrease its energy consumption and in general increase the fuel efficiency of the vehicle. Generally, these increases in efficiency are accompanied by a decrease in vehicle performance, which is often undesirable to the vehicle operator. Reducing wind resistance has been one means by which these improvements have been implemented.

Wind energy recovery systems for vehicles are desirable for transferring kinetic energy of a windspeed relative to the a vehicle to rotational motion for driving an electric generator or alternator. Although all energy cannot be recaptured (a feat which would be impossible), some lost energy may be recovered. Energy recapturing and harvesting is of particular interest as conserving energy and achieving the maximum benefit from the energy available is very important for powered vehicles, from completely electrical vehicles to internal combustion engines and combinations thereof, that invariably require some form of electrical power. Such vehicles need to be efficient by avoiding frequent recharging of batteries. Current land vehicles that utilize motors supported by electrical energy have the limitation of requiring re-charging of the battery packs.

Several prior attempts have been made to utilize wind energy of moving vehicles to turn propellers, air turbines, treadmills or rotors, which, in turn, are connected by various means, to a generator. U.S. Pat. No. 3,910,623 issued to McKeen on Oct. 7, 1975 discloses a means for reducing oncoming air resistance and angle wind effects to a moving vehicle. The effects of oncoming air resistance and angled winds on a moving vehicle are minimized by forcing air at relatively high velocity up through a transverse nozzle system extending across the vehicle's front and providing a means for directing a portion of said air through a vented duct along the vehicle's roof. Air from the nozzle system follows the front contour of the vehicle up and across the windshield and further tends to flow back along the vehicle's roof. Oncoming air in front of the vehicle also follows this air stream along the contour of the vehicle. A low-pressure region is thereby created to the vehicle's front. A portion of the front air enters the duct that extends along the vehicle's roof. Air entering and exiting through top vents in the duct tends to control boundary air across and along the vehicle's roof and assist in filling the void to the vehicle's rear. As above, this system redirects air to avoid large surfaces, the air is not captured and/or transferred to electrical energy.

U.S. Pat. No. 3,934,923 issued to Lissaman on Jan. 27, 1976 provides a drag reducing means for a truck, the means comprising a porous structure typically mounted on the cab roof to pass air into the gap between the cab and trailer body in rearward flowing streams that undergo deceleration. Eddies are formed in the gap and act as a barrier to airflow into the gap at its sides and top. Although this system redirects air to avoid large surfaces, the air is not captured and/or transferred to electrical energy.

U.S. Pat. No. 4,022,508 issued to Kirsch on May 10, 1977 provides an air drag reducing means for vehicles. The patent discloses a means for reducing the air drag on vehicles. In one embodiment the air drag reducing means employs an airvane member secured in spaced relation to an air flow guide element in kit form for mounting adjacent a corner edge of the bluff surface to prevent separation of air flow from the corner edge and adjacent rearward surface of the vehicle and develop a net forward thrust on the air drag reducing means. Another embodiment includes an airvane member and means for mounting it adjacent a smooth curved windward corner edge of a bluff surface on the vehicle so as to define an air flow passage through which air passes from the bluff surface in attached relation to the corner edge and adjacent rearwardly extending surface of the vehicle. As with the other systems, this system is a passive system and does not generate electricity.

One system that is designed to generate electricity from air encountered by a vehicle can be found in U.S. Pat. No. 6,882,059 issued to DePaoli on Apr. 19, 2005. This system is designed to be attached to the front of a vehicle and is formed to extend substantially the length of the front of the vehicle. Intercepted airflow is directed into a channel. Inside the channel a turbine is rotatably mounted and an electrical generator attached to the turbine generates energy. The housing can be attached to the front bumper of a vehicle or can replace the front bumper It has thus been shown that the use of wind driven rotors or vehicle mounted wind powered electric generators are known in the prior art. Existing vehicle mounted power generating systems make use of wind to provide power to vehicles. These systems include a wind turbine driven generator on a moving vehicle in order to supply electric power for purposes such as recharging a battery or running accessories. Such turbine generator units have been mounted on the roof of the passenger compartment as well as on top of the front hood of the vehicle. Some of these devices are complex and difficult to manufacture. Vehicle attached power generation devices use movable deflectors to guide the wind into the cage where a single set of blades drives a generator. These known systems are complex, with control systems and inefficient rotor designs, thereby not making them practical to be placed and integrated into a moving vehicle. Also the housing that contains the turbine on the roof of the vehicle greatly adds to the vehicle's wind resistance. The power source that propels the vehicle must produce more power in order to overcome the wind resistance, thereby reducing the efficiency of the vehicle. Some turbine generator units mounted on top of the front hood of the vehicle have the additional disadvantage of obstructing the view of the driver of the vehicle, thereby causing a safety hazard. Turbine generator units mounted on the roof or front hood of the vehicle have the further disadvantage of being aesthetically unappealing.

Hence, it can be seen that, there is a need for a new and improved moving wind energy recovery system that can be used for generating electricity through rotational motion produced by moving wind. Such an improved moving wind energy recovery system installed on a vehicle would also depart from the conventional concepts and designs of the prior art, and in doing so provides an apparatus primarily developed for the purpose of generating electricity through rotational motion produced by moving wind. Such a system would minimize the drag and would not affect the aesthetics of the vehicle.

SUMMARY OF THE INVENTION

The present embodiment is a wind powered electrical power generating system for decreasing wind resistance of a moving object and harvesting energy from the air encountered by the moving object.

In a preferred embodiment the wind powered electrical power generating system comprises a box portion, designed to be attached to a bottom portion of the vehicle, having a front opening, a rear opening and an inside compartment. A plurality of turbines having a plurality of blades is rotatably mounted within the box portion. At least one electromechanical generator is rotatably coupled with at least one turbine for converting turbine rotation caused by the wind flow into electrical energy. The wind flowing though an interior of the box portion is guided and directed to the plurality of blades of the turbine by a plurality of vanes attached to the box portion. The electrical energy generated by the electromechanical generator is transferred to at least one battery. When the vehicle is moving in a forward direction the high velocity air is passed through the interior of the box portion which in turn rotates the at least one turbine and the coupled electromechanical generator to generate electrical energy.

When the vehicle is moving forward, air enters the system through a front portion of the vehicle. The box portion has a front compartment with the front opening and the air is passed through an underside passage and exhausted through the rear opening at the rear end of the vehicle.

It is thus an object of the present invention to harnesses the energy from air encountered by a moving vehicle to both decrease the total air resistance encountered by the vehicle and convert the mechanical motion caused by the air to electrical energy.

It is a further object of the invention to optimize airflow through the vehicle to maximize energy generated.

It is a further object of the invention to provide a system that is easy to maintain and that comprises damage prevention measures, including damage due to rain and excessive energy generation These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
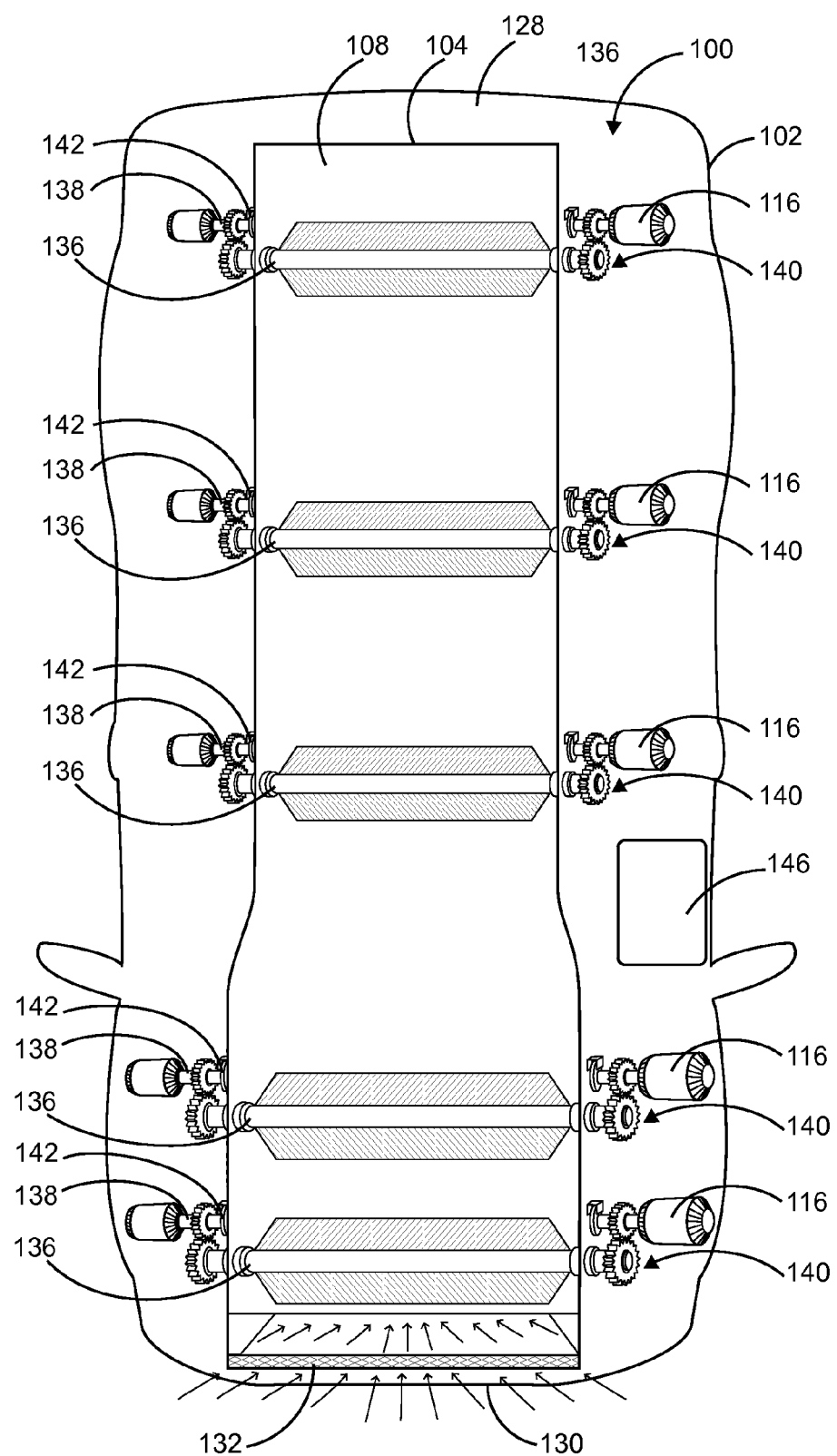
FIG. 1 illustrates a cutaway plan view of a box portion of a vehicle.

Turning first to FIG. 1, a cross sectional view of a wind powered electrical power generating system 100 installed on a vehicle 102 is illustrated. The wind powered electrical power generating system 100 comprises a box portion 104 having a front opening 106, a rear opening 108 and an inside compartment 110. The box portion 104 is designed to be attached to a bottom portion of the vehicle 102 for utilizing the wind force generated during movement of the vehicle 102 in a forward direction. A plurality of turbines 112 having a plurality of blades 114 are rotatably mounted within the box portion 104. At least one electromechanical generator 116 is rotatably coupled with at least one turbine 112 for converting turbine rotation caused by the wind flow into electrical energy. The wind flowing though an interior of the box portion 104 is guided and directed to the plurality of blades 114 of the turbine 112 by a plurality of vanes 118 attached to the box portion 104. The electrical energy generated by the electromechanical generator 116 is transferred to at least one battery 122 using an electrical connecting means 120. The electrical connecting means 120 preferably includes wires connected between the battery and charge collecting rings of the electromechanical generator 116. When the vehicle 102 is moving in a forward direction the high velocity air is passed through the interior of the box portion 104 which in turn rotates the at least one turbine 112 and the coupled electromechanical generator 116 to generate electrical energy. The generated energy is transferred to the charge storing battery 122 through the electrical connecting means 120. The electromechanical generator 116 is connected to the battery 122 using the electrical connecting means 120 having a circuitry inside a control box 146. The control box 146 may include electrical circuitry to convert AC/DC generated by the electromechanical generator 116 to a value that is safely stored by the battery 122.

When the vehicle 102 is moving forward, air enters the system 100 through a front portion 130 of the vehicle 102. The box portion 104 has a front compartment 124 with the front opening 106 and the air is passed through an underside passage 126 and exhausted through the rear opening 108 at the rear end 128 of the vehicle 102. The box portion 104 in the preferred embodiment of the invention harvests the force of the wind generated as the vehicle 102 moves quickly through the air. The box portion 104 is incorporated and integrated into the body of the vehicle 102, and allows the air to easily flow through the vehicle 102 instead of around it. As the vehicle 102 moves forwards or backwards, the air travels through the system 100 and is focused and directed towards a plurality of electromechanical generators 116.

In FIG. 1, the box portion 104 in the preferred embodiment extends nearly the entire nearly width of the vehicle's front, but not completely, thereby allowing space for the plurality of electromechanical generators 116 on each side of the box portion 104. The front opening 106 of the box portion 104 has width of a front of the vehicle 102. The box portion 104 is widest in the front to provide for maximum air capture, but then narrows in order to increase the pressure of the air travelling through the system 100 and ultimately contacting and turning the plurality of electromechanical generators 116. In short, the system 100 is roughly funnel-shaped in order to increase the air drawn in and increases the pressure on the plurality of blades 114 of the first four turbines (not shown), which in this preferred embodiment are positioned just behind the front of the vehicle 102. The front opening 106 of the box portion 104 is covered by a mesh screen 132 to prevent foreign objects from getting trapped inside the box portion 104. The mesh screen 132 is removably mounted in between the front opening 106 and a bumper of the vehicle 102. The plurality of blades (not shown) of each of the turbines (not shown) is radially extending from a central hub (not shown) attached to a central axle 136. The central axle 136 is mechanically coupled to a shaft 138 of the electromechanical generator 116. The turbine (not shown) is mechanically engaged with the electromechanical generator 116 by a first gear arrangement 140. The electromechanical generator 116 has a flywheel 142 attached to the shaft 138 for storing mechanical energy when the turbine (not shown) is in operation. The electromechanical generator 116 is engaged with the flywheel 142 by a second gear arrangement.

Figure 2:
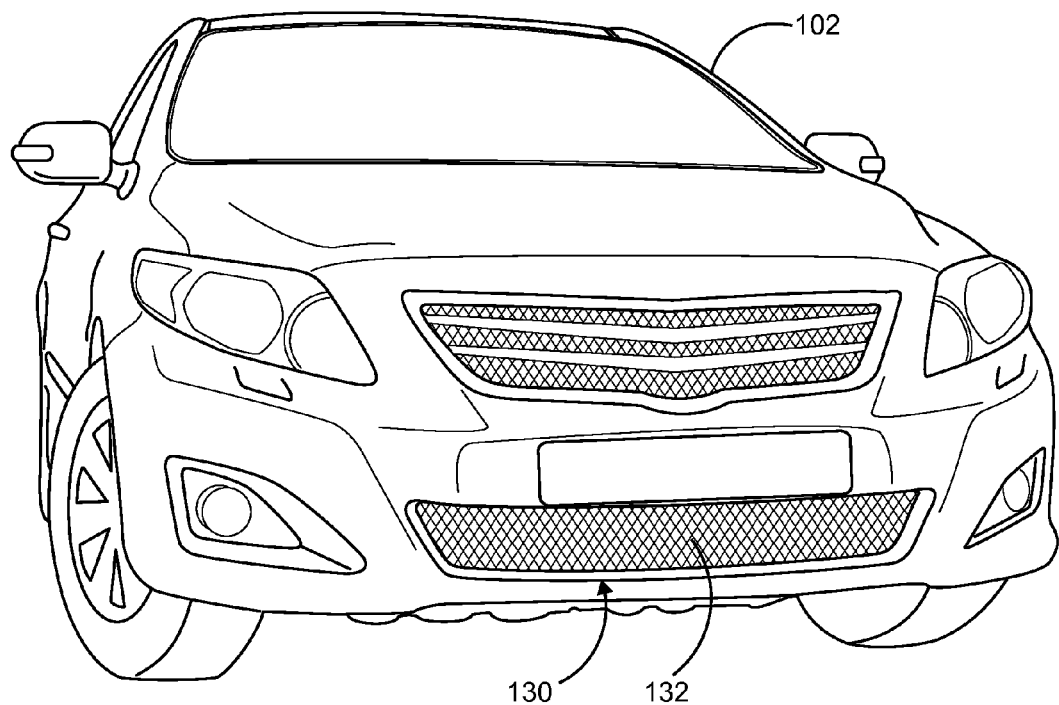
FIG. 2 illustrates a perspective front view of a vehicle equipped with a wind powered electrical power generating system.

Turning to FIG. 2, the front portion 130 with a faceplate of the front of the vehicle 102 is shown. The faceplate comprises two parts. The first part attaches to the box portion 104, thereby creating the opening. The second part of the faceplate is the mesh screen 132, used to protect the system 100 from foreign objects that may enter. The casing for the system 100 terminates just under prior to the front portion 130 of the vehicle 102, in order to allow space for the mesh screen 132. The mesh screen 132 is screwed, bolted, or otherwise fastened into position at the front portion 130 of the vehicle 102. Air passes through the mesh screen 132 into the inside compartment (not shown), rotates the plurality of turbines 112 and the mechanically coupled electromechanical generators 116 and generates electricity.

Figure 3:
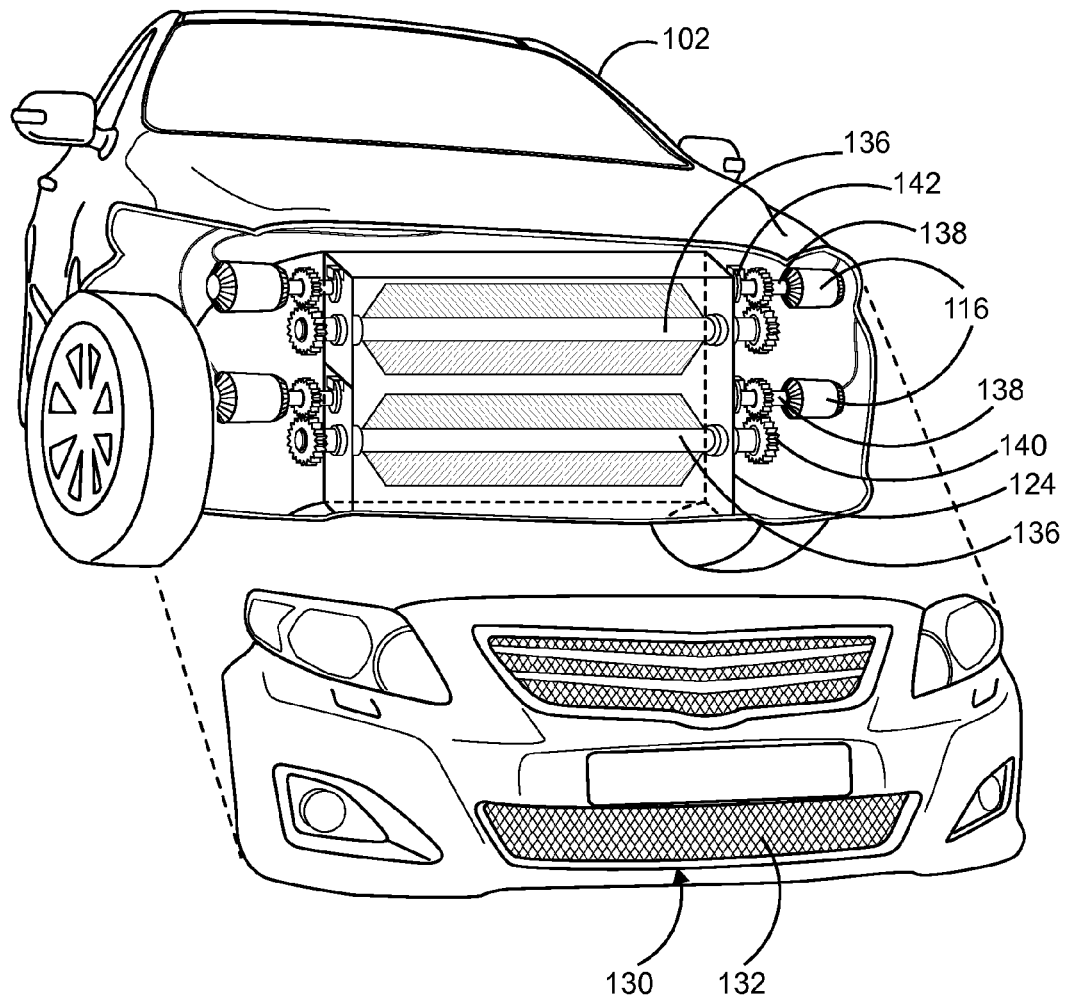
FIG. 3 illustrates a partial cutaway view of a front portion of the vehicle showing a front compartment.

Referring now to FIG. 3, there is shown in dotted outline of the vehicle 102 previously illustrated in FIG. 2. FIG. 3 illustrates the front portion 130 removed or exploded forward to expose the structure of the front compartment 124, the central axle of the two turbines 112 positioned at the front opening 106, four electromechanical generators 116 mechanically coupled to the four turbines 112 at the front opening 106 and the first gear arrangement 140 connecting the central axle 136 of each turbine 112 each one of the electromechanical generators 116. The front opening 106 at the front compartment 124 has a larger cross sectional area than the underside passage 126 of the box portion 104 for increasing the pressure of the wind. The larger cross sectional area of the front opening 106 draws maximum air and passes the air through the inside compartment 110 of the box portion 104. The front opening 106 at the front compartment 124 of the vehicle 102 feeds or supplies air to the plurality of turbines 112. The shaft 138 of each electromechanical generator 116 is connected to the flywheel 142. The flywheel 142 is used to store excess mechanical energy produced by the turbines 112 when the vehicle 102 is moving fast forward. The flywheel 142 also acts as brakes to the electromechanical generators 116 for stopping the rotation or to reduce the speed of rotation to control the electricity generation. This helps to control the amount of electricity generated by the electromechanical generators 116 when the vehicle 102 is moving at very high speeds. Exhaust air from the plurality of turbines 112 exit through the rear openings 108 of the vehicle 102.

Figure 4:
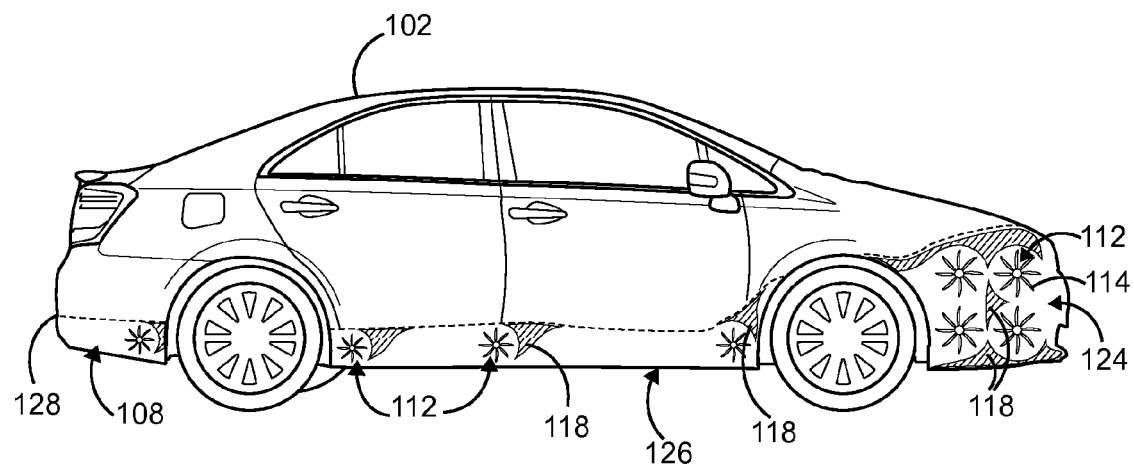
FIG. 4 illustrates a side view of the vehicle showing the wind powered electrical power generating system.
Figure 5:
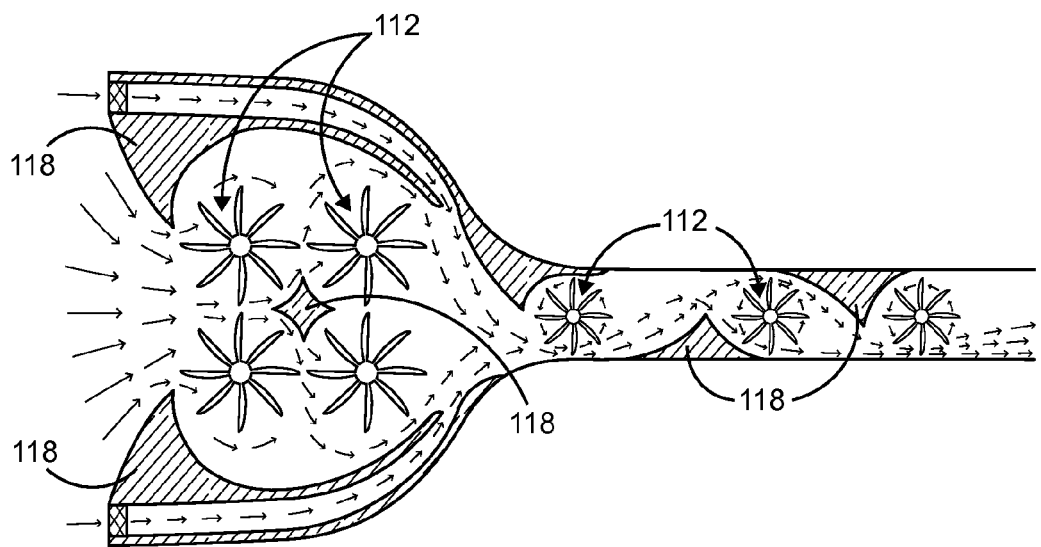
FIG. 5 illustrates a enlarged sectional side view showing the wind powered electrical power generating system.

FIG. 4 is a partial cutaway view of a side of the vehicle 102 according to the preferred embodiment is present invention. FIG. 4 and FIG. 5 both show that there are actually two rows of two turbines 112, for a total of four turbines 112 in the preferred embodiment. From the figure it is clear that there are four turbines 112 at the front opening 106 of the front compartment 124 of the vehicle 102. The front compartment 124 is close to the front portion 130 of the vehicle 102. In this embodiment the number of blades 114 of each of the turbine 112 is kept as eight, for converting maximum energy from the flowing air to mechanical energy. The plurality of vanes 118 guides the flowing air to the plurality of blades 114 of the turbines 112. When compared to FIG. 4, the four star shaped wind collectors of FIG. 5 may includes thinner blades 114, and the triangular shape between the four star shaped wind collectors is slightly more star-shaped. There are two channels, one on top and one on bottom, for directing extra air to the back of the system 100. The vanes 118 at the center of the front opening 106 are diamond shaped for more efficiently directing the air to the blades 114.

Figure 6:
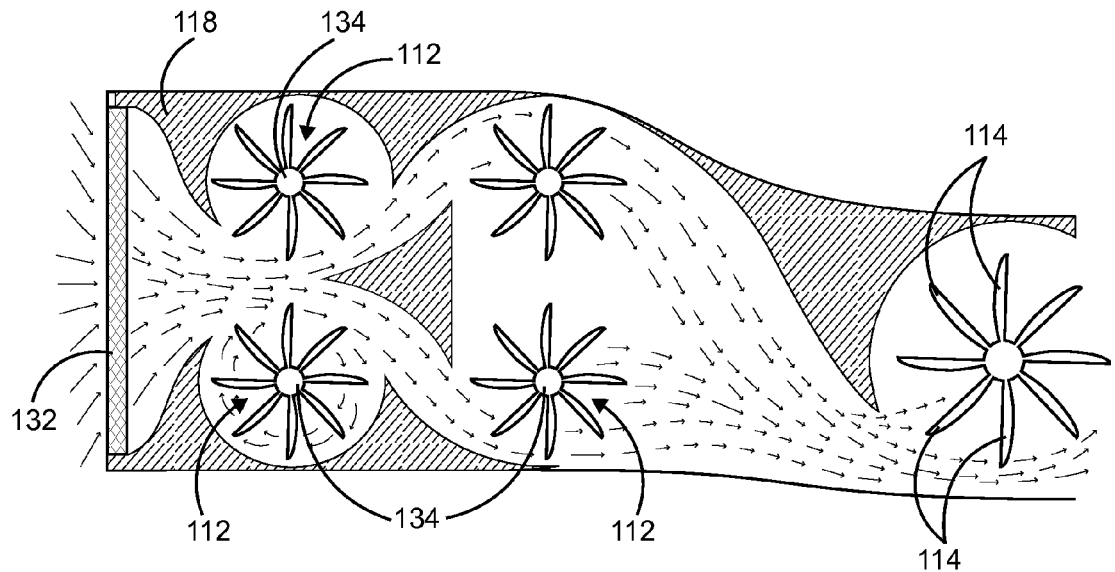
FIG. 6 illustrates a sectional side view of the wind powered electrical power generating system.
Figure 7:
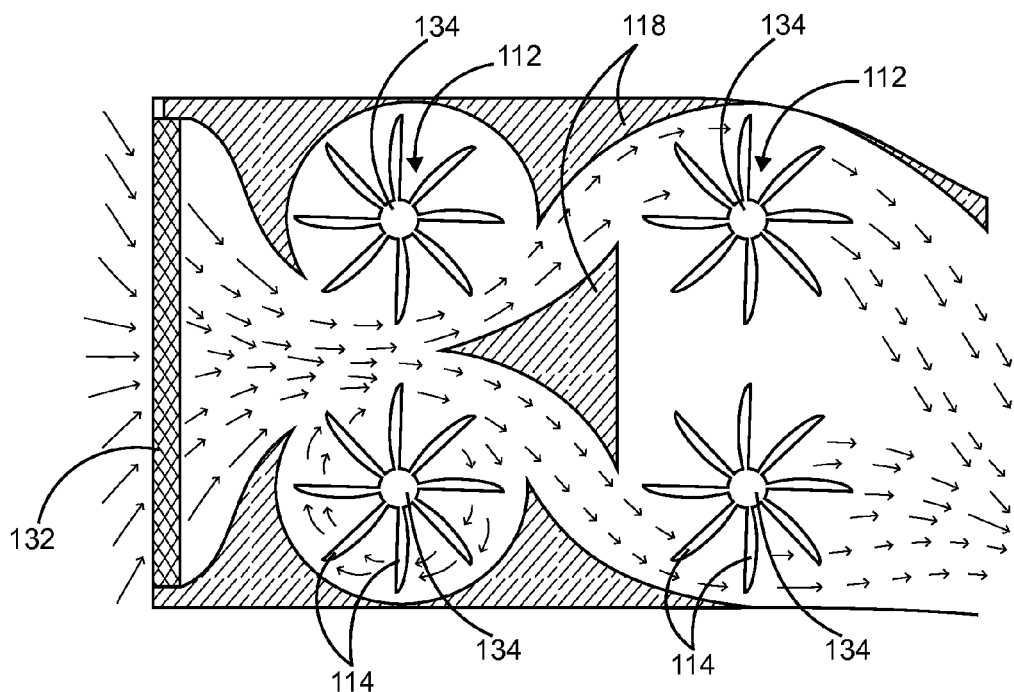
FIG. 7 illustrates an enlarged sectional side view of the front compartment of the wind powered electrical power generating system.

FIG. 6 and FIG. 7 depict a diagrammatic view of the airflow and the blades 114, attached around the central hub 134, encountered by it. As can be seen the upper left and lower right turbines 112 in this image will rotate counterclockwise due to the force of the wind, while the lower left and upper right turbines will rotate clockwise. As shown in FIG. 6 and FIG. 7, the box portion 104 becomes thinner towards the rear end 128 of the vehicle 102. This is because some of the energy will have already been removed from the wind, and the remaining energy can be concentrated by channeling the wind through smaller areas. FIG. 6 and FIG. 7 both show that there are actually two rows of two blades 114, for a total of four blades 114 in the preferred embodiment. FIG. 6 also clearly shows that airflow is allowed to pass completely through the vehicle 102 as it travels forward, exiting out the rear end 128 of the vehicle 102 through a nozzle preferably shaped like a trumpet horn.

Figure 8:
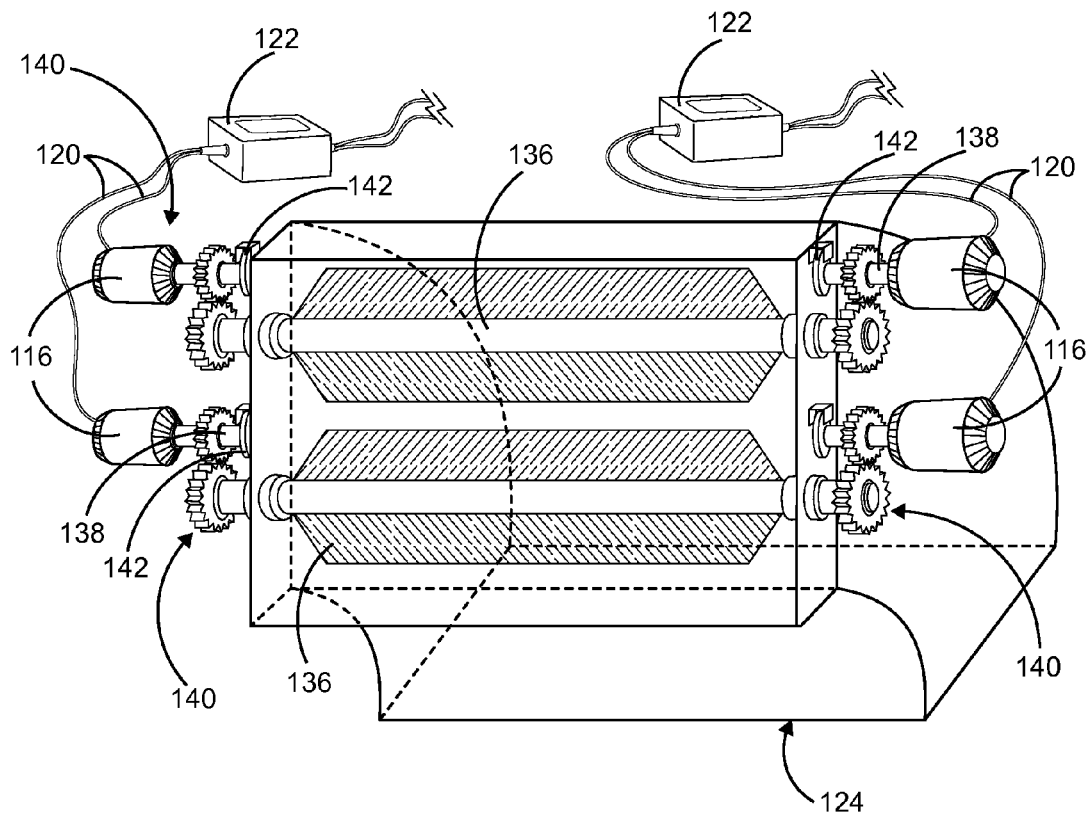
FIG. 8 illustrates a cutaway view of two turbines and corresponding shafts, generators and brakes according to the preferred embodiment of the present invention.

Turning now to FIG. 8, the electricity generated may be utilized in several ways. For electric vehicles or hybrid vehicles, the energy may be sent to the battery packs 122 already in the vehicle 102 through the wires 120, just as would occur through engine recharging or regenerative braking. If necessary, an AC/DC converter and automatic power relay may be utilized as well. Although various battery types may be used, in a preferred embodiment the system utilizes Lithium Ion batteries, which due to their greater energy density allow an extended range when compared to conventional batteries. The batteries 122 may further be charged at the home by a conventional power source as is currently known in the art.

The system 100 may also be implemented with two batteries 122, wherein one battery 122 is being recharged by the system 100 while the other is used to power an electric motor for the vehicle 102. In this regard, when the battery 122 being used by the motor has reached a low enough charge state that it is no longer useful to the vehicle 102, the system 100 may automatically switch the battery connections such that the nearly-depleted battery 122 is now being charged while the newly-charged battery 122 powers the vehicle 102. In systems where only one battery 122 is in place, that battery 122 is recharged while in use.

Under normal efficiency operation, the efficiency of the electromechanical generator 116 varies with the speed of rotation of the blade 114 and consequently, the shaft 138. That is, there is at the low end a certain number of revolutions per minute that are required to generate any electricity, and the high end there is a maximum number of revolutions per minute, above which damage may occur to the system 100 through mechanical failure or overheating of the electromechanical generator 116. Somewhere between the minimum and the maximum is a peak efficiency of energy capture.

In order to more quickly reach the peak efficiency of energy capture, in an alternative embodiment of the invention reduction or multiplier gears are provided to bump up or reduce the number of revolutions per minute of the shaft with respect to the spinning blade. The system 100 includes a speed reduction means associated with the gear arrangement 140 for controlling the speed of rotation of the electromechanical generator 116, thereby controlling the electricity generated. At high speeds the speed reduction means reduces the gear ratio to reduce the speed of rotation of the electromechanical generator 116 and at low speeds the speed reduction means increases the gear ratio to increase the speed of rotation of the electromechanical generator 116 to generate an optimal quantity of electricity. For instance, in the preferred embodiment, the ratio is 1:1, however, if the vehicle 102 is moving slowly and the peak efficiency is not reached, a multiplier gear may convert each revolution of the blade to two revolutions of the shaft, effectively making the shaft run at a 2:1 ratio relative to the blade.

In order to prevent mechanical damage to the system 100 due to overheating or the over-generating of electricity beyond what the system 100 can handle, in an additional alternative embodiment brakes are supplied to the turbines 112 and are activated when the blades of the turbine 112 reach a critical number of revolutions per minute. The operator of the vehicle 102 may apply the brakes manually or the system 102 may apply them automatically. A flywheel 142 attached to the end of the shaft 138 of the electromechanical generator 116 may act as the brakes for the system 100.

Figure 9:
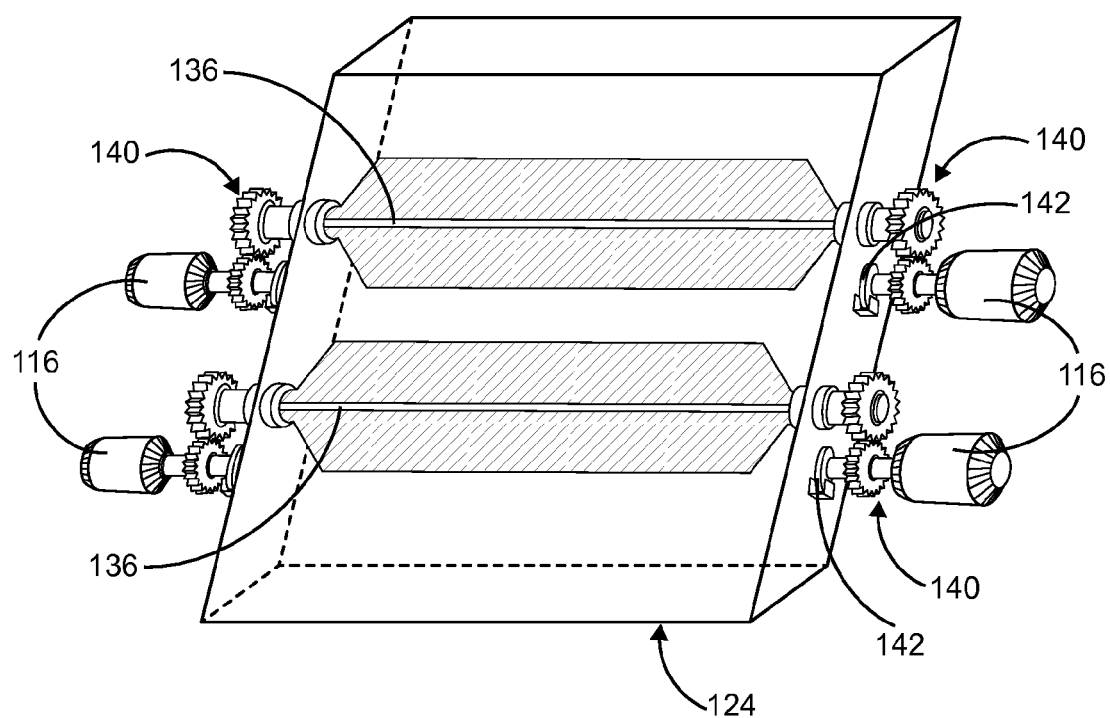
FIG. 9 illustrates a second detailed top cutaway view of two turbines and corresponding shafts, generators, brakes and gear arrangement according to the preferred embodiment of the present invention.

FIG. 9 shows another diagrammatic view of two blades, associated gears including the first gear arrangement 140, electromechanical generators 116, and brakes or flywheel 142. It also shows the location of a maintenance coupling. The blades 114 of the present system 100 are removable, and in order to gain access the individual merely unhooks a maintenance coupling on each side of the system 100, inside the box portion 104. Screws on the sides of vanes 118 allow the vanes 118 to also be removed in order to service the system 100.

Figure 10:
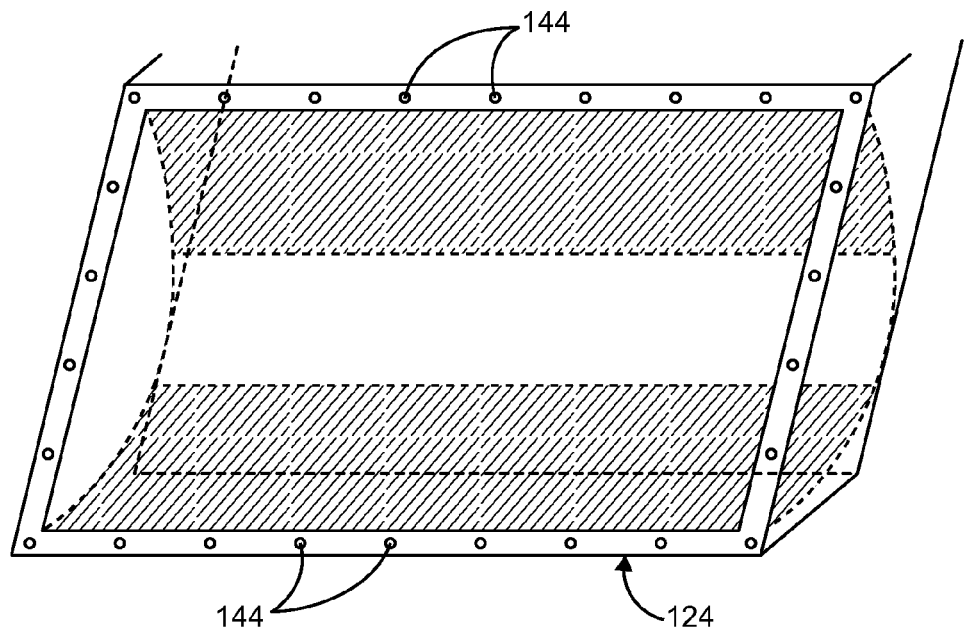
FIG. 10 illustrates a perspective front view of the front of the front compartment according to the preferred embodiment of the present invention.
Figure 11:
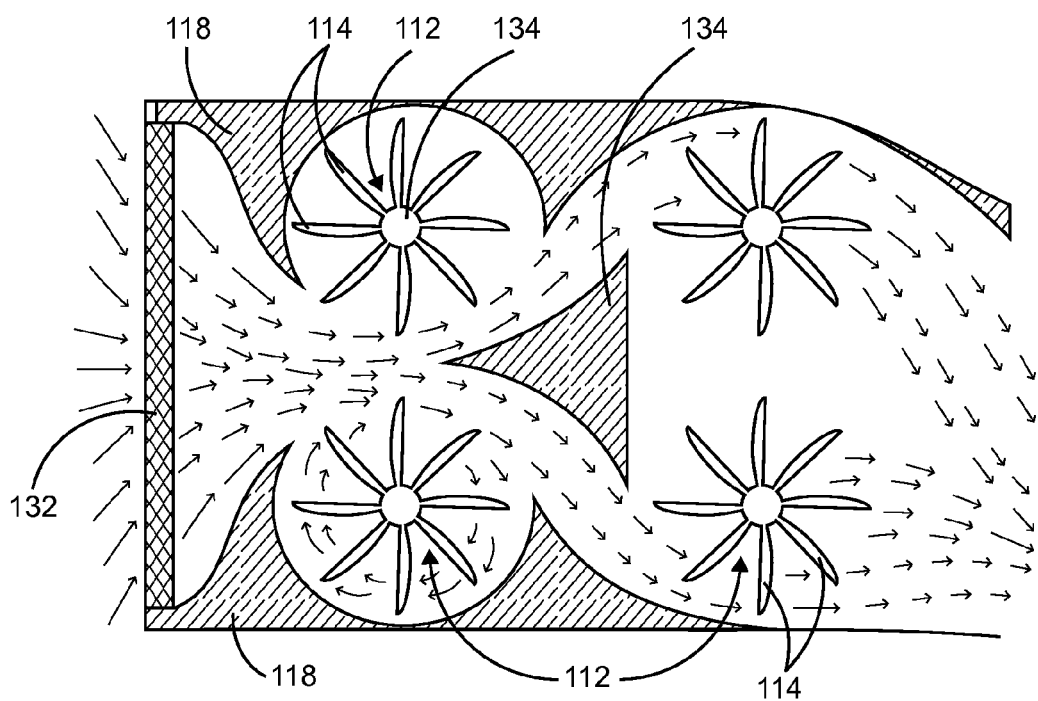
FIG. 11 illustrates a diagrammatic side view of the first four turbines of the system.
Figure 12:
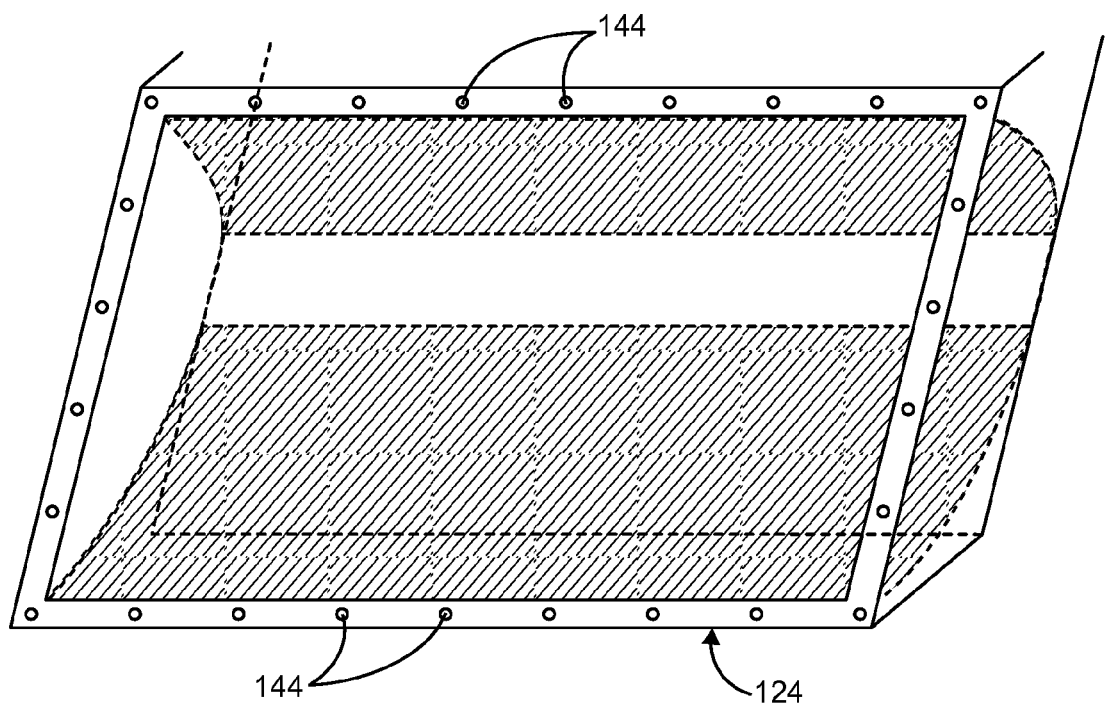
FIG. 12 illustrates a perspective front view of the front of the front compartment according to the preferred embodiment of the present invention.
Figure 13:
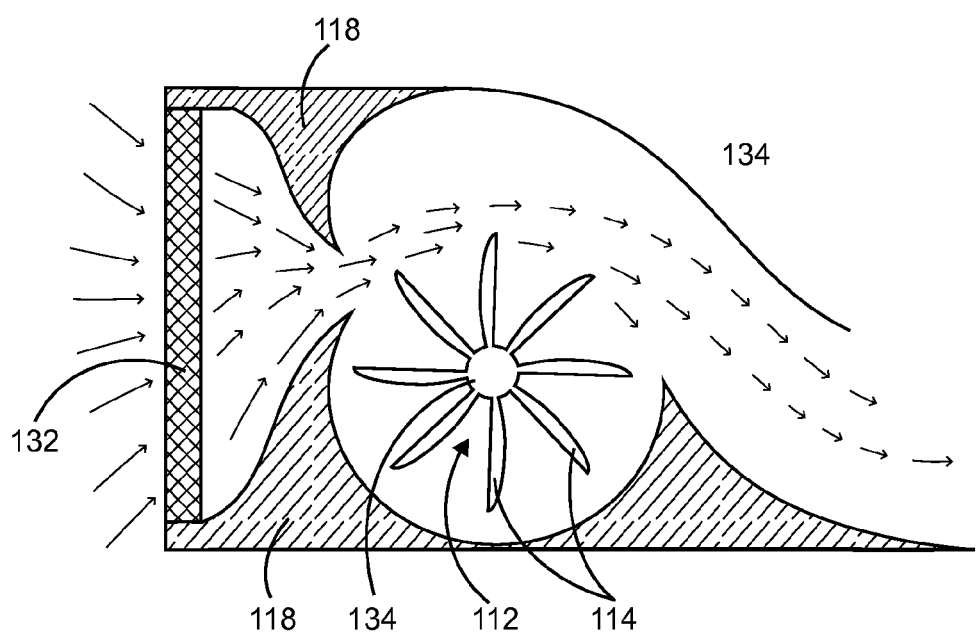
FIG. 13 illustrates a diagrammatic side view of the first turbine of the system.

FIG. 10 shows the front compartment 124 of the system 100. The front compartment 124 has provisions including screw holes 144 for securing the mesh screen 132 thereto. The system 100 described above comprises four turbines 112 towards the front portion 130 of the vehicle 102, shown again in FIG. 11. Accompanying FIG. 12 is FIG. 10, which is a perspective view of the front compartment 124 at the front portion 130 of the vehicle 102. As expected, the opening in this configuration directs wind towards the center of the system 100, where some of it encounters the blades/turbines 112 on the left side of FIG. 11, while the remainder is deflected off of these blades 114 and around the triangular vane 118 in the middle of FIG. 11. In an alternative embodiment shown on FIG. 12 and FIG. 13, just one turbine 112 is present at the front portion 130 of the vehicle 102. It is contemplated that one turbine 112 may be efficient enough to capture sufficient energy from the wind. In this configuration, the opening as shown in perspective view FIG. 12 directs air upwards and towards the single turbine 112. Although four turbines are shown in FIG. 11 and one turbine is shown in FIG. 13, these turbines 112 may be split into two each, directly down the middle of the car 102. Thus the turbines 112 shown represent only the left side turbine, and the right side turbine is directly in line and behind the other. Thus, in this alternative embodiment the system 100 shown in FIG. 11 represents eight turbines, while the system shown in FIG. 13 represents two turbines.

Figure 14:
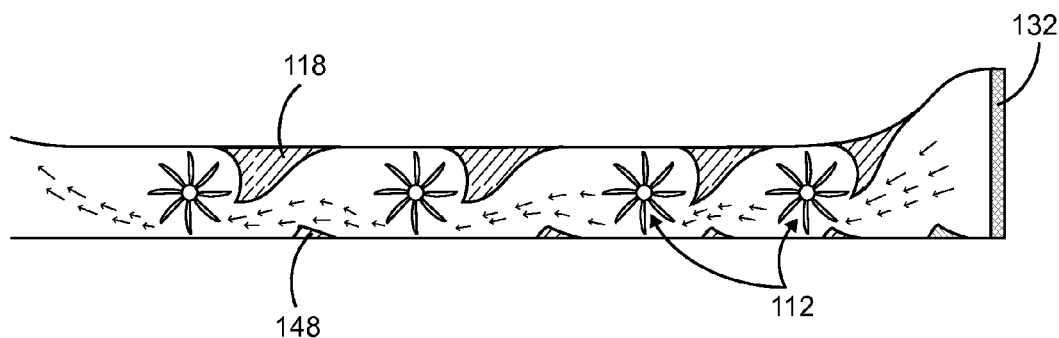
FIG. 14 illustrates a diagrammatic side view of the system showing vanes and water drain openings according to an alternative embodiment of the invention.

The system 100 comprises specialized components for operation in rainy conditions. These are shown best in FIG. 14 and FIG. 15. Beginning with FIG. 14, air is shown entering on the right, and being directed to four turbines 112 through vanes 118 on the top of the channel. As may be expected, when the vehicle 102 is in motion rainwater may enter the system 100 along with air. The flooring of the box portion 104 comprises specific openings 148 throughout that allow water to flow down and out naturally, but without significantly reducing the power supplied by the air encountered. These openings 148 are shown as five small components along the floor in FIG. 14. The openings 148 face backwards and are streamlined on their frontward side. This allows wind that hits the frontward side to glide over the top, but rainwater may still drain through the openings 148 through the rearward facing side.

During snowy conditions, snow and ice may clog the front mesh screen 132 of the system 100, thereby preventing normal operation. As an alternative embodiment, the mesh screen 132 may be heated with a set of wires so that when the snow hits the mesh screen 132, the snow melts and enters the system 100 as water. The water then drains through the water outlets or openings 148 as described above.

Figure 15:
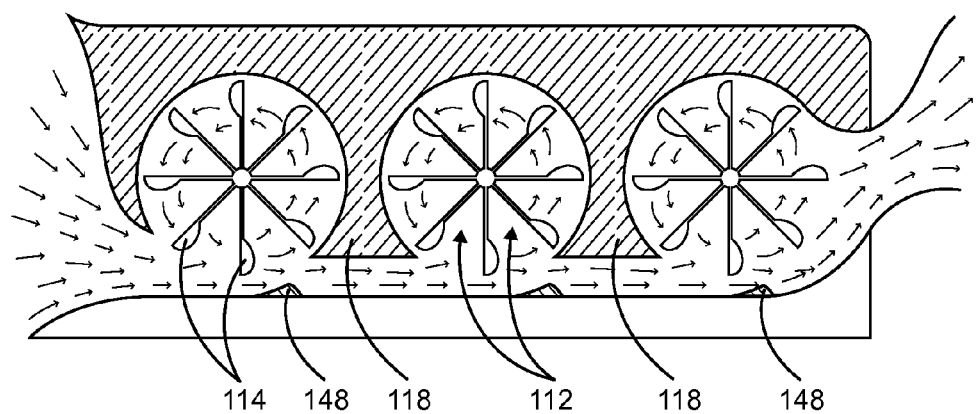
FIG. 15 illustrates a diagrammatic side view of the system showing direction of wind travel and three turbines according to an alternative embodiment of the invention.

FIG. 15 shows an alternative embodiment of the invention where the turbines 112 comprise eight sided blades 114 with small cups affixed at the radially outward end. These cups catch the wind moving through the system 100, thereby rotating the turbines 112 and in turn generating electricity as described above. FIG. 15 also depicts three water drain openings 148, again facing backwards to allow water to drain out but to not dramatically disturb the airflow.

The present system may work with a variety of vehicles. Larger vehicles that encounter greater amounts of air may utilize a system comprising larger generators, while smaller vehicles that encounter lesser amounts of air may utilize a system 100 comprising smaller electromechanical generators 116. The size of the electromechanical generators 116 and/or wind turbines 112 determines the amount of electricity that is generated. There is no upper limit to the number of turbines 112 or generators 116, and it is expected that on very large vehicles such as tractor-trailers or trains that many turbines 112 may be present.

Figure 16:
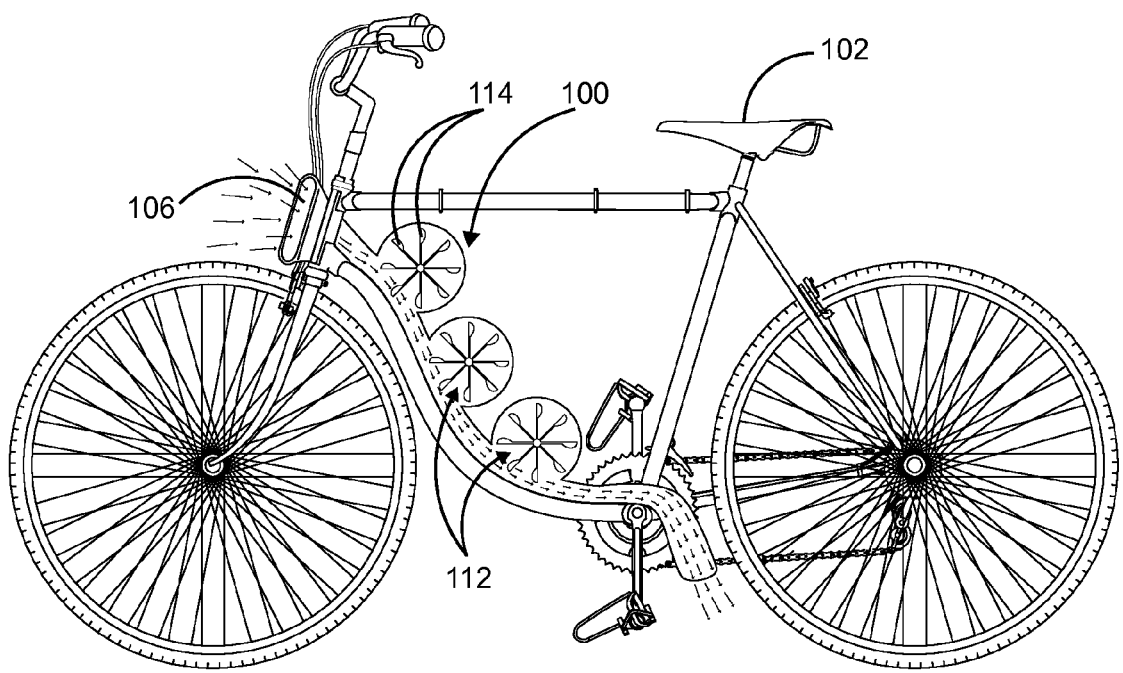
FIG. 16 illustrates a perspective side view of an additional alternative embodiment of the invention wherein the system is installed on a motorcycle.
Figure 17:
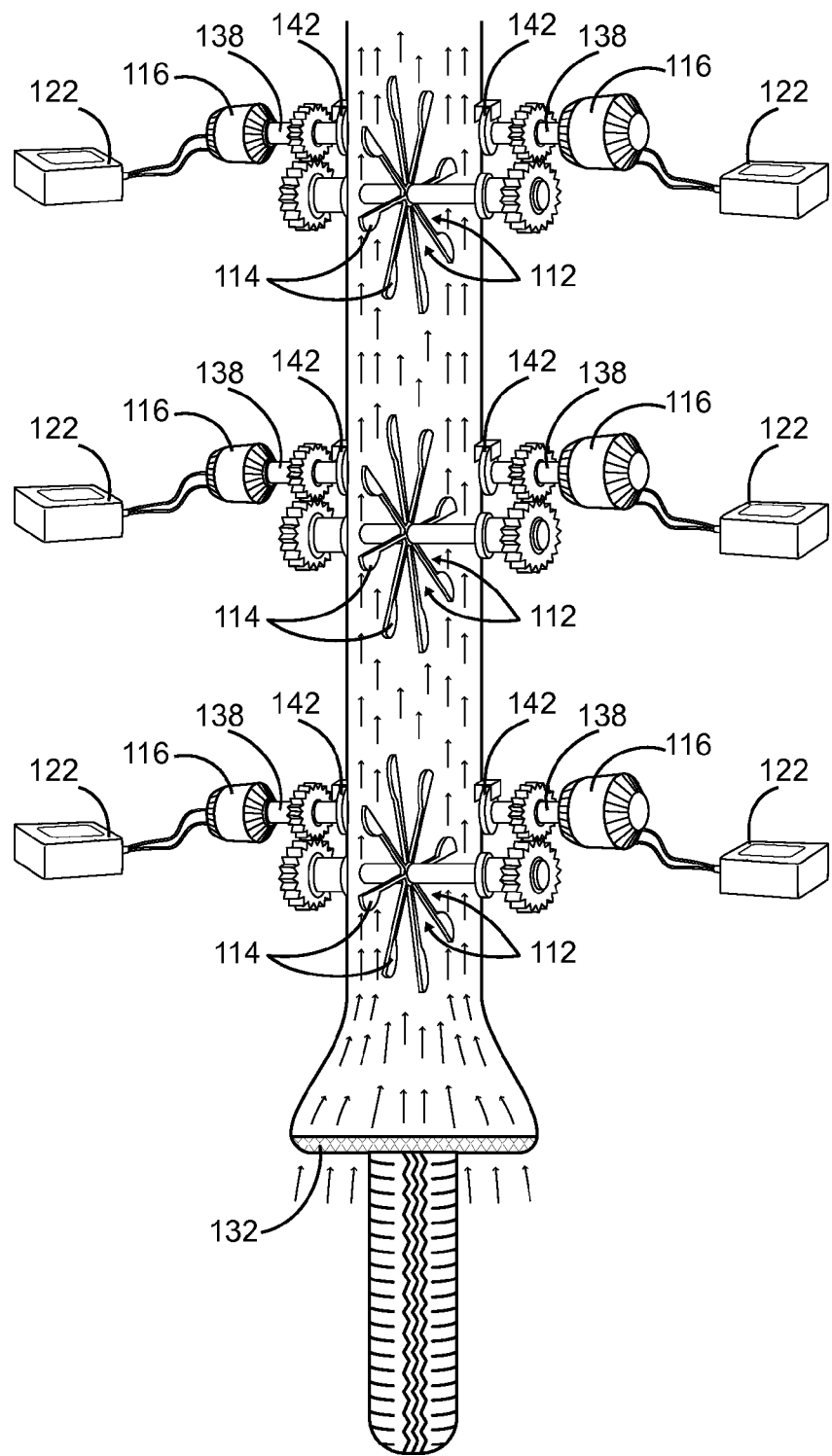
FIG. 17 illustrates a top plan of the additional alternative embodiment of the invention wherein the system is installed on a motorcycle.

In an additional alternative embodiment of the invention shown in FIG. 16 and FIG. 17, the system 100 is equipped on a motorcycle 102. In the case of the motorcycle 102, the housing for the system 100 is preferably thinner and arranged in a more upright position. Although a bicycle is depicted in this figure, the principle of the invention is the same regardless if the bicycle is powered by a separate motor (making it a motorcycle) or human powered. FIG. 16 depicts the airflow running through a motorcycle 102 as it moves forward. Here, the air intake area of the front opening 106 is larger and round, and slims down to allow the air to enter the area with the spoon like turbines or blades 112, which rotate due to the force of the air encountered. As with the previous system and as shown in the top view of FIG. 17, the system 100 is connected to electromechanical generators 116 which provide energy to at least one battery 122, and in the preferred embodiment on FIG. 17, at least two Lithium Ion batteries. As in FIG. 17, the system 100 may further include gear reduction or gear multipliers 140 to optimize the power generated, and may further comprise brakes or flywheels 142 in the event the turbines or blades 112 are susceptible to turning too fast and damaging the system 100. The brakes 142 may alternatively be applied to fewer than all turbines 112. The braking system can be applied for localized control of the turbines 112. For example if the vehicle is moving at fast speeds, air at high velocities enter the system 100 through the mesh screen 132 and rotates the blades 114 of the first turbine 112 at a faster rate than the following turbines 112 at the back. This is because the energy of the air reduces as it passes through each turbine 112. It is expected that due to increased air pressure the first turbine 112 towards the front of the bike may be the only turbine 112 to rotate at over speeds. In that case, the braking system including the flywheel 142 may be applied only to that turbine 112. This will reduce the speed of rotation of the electromechanical generator 116, the shaft 138 rotation will reduce which in turn reduces the speed of rotation of the electromechanical generator 116.

In the preferred and alternative embodiments described heretofore, the wind powered electrical power generating system 100 installed on a vehicle 102 comprises at least one electromechanical generator 116. It is noted that in an alternative embodiment the system 100 need not comprise any electromechanical generators 116, but that simply by virtue of the fact that air is directed through the vehicle 102 instead of around it, efficiency is increased.

Figure 18:
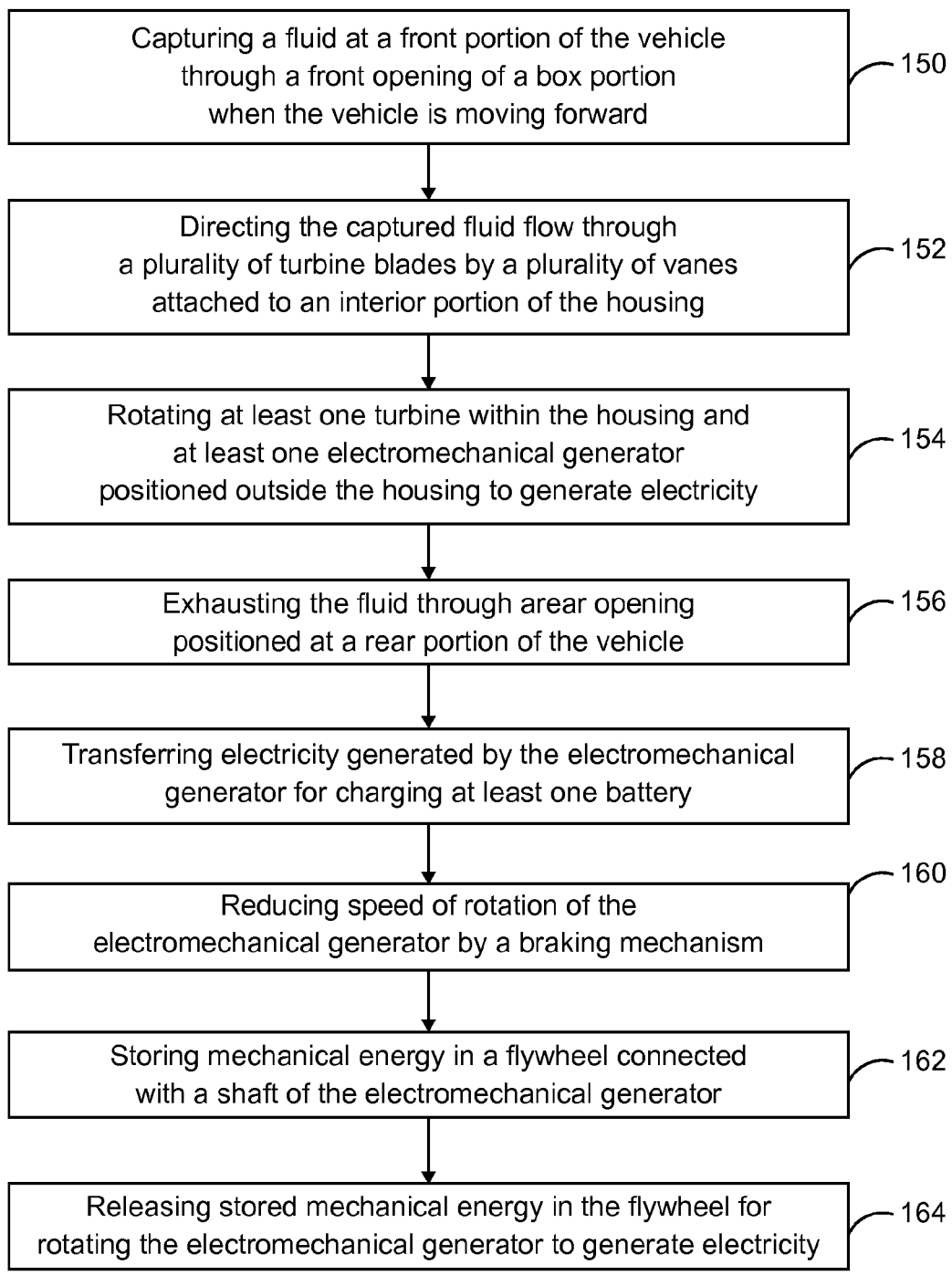
FIG. 18 illustrates a flowchart showing a method for generating electricity from the wind operated electricity generating system.

FIG. 18 illustrates a flowchart showing a method for generating electricity from a wind operated electricity generating system installed in a vehicle. The method includes the steps of capturing wind (technically a fluid, as all gasses and liquids behave as and can be considered as fluids, from a physics standpoint) at a front portion of the vehicle through a front opening of a box portion when the vehicle is moving forward as shown in block 150. Then the captured fluid (preferably air encountered by a moving vehicle) is directed to flow through a plurality of turbine blades by a plurality of vanes attached to an interior portion of the housing, shown in block 152. At block 154, at least one turbine is made to rotate within the housing by the air and at least one electromechanical generator positioned outside the housing to generate electricity. Then the air is exhausted through a rear opening positioned at a rear portion of the vehicle as shown in block 156. At block 158, the electricity generated by the electromechanical generator is transferred for charging at least one battery. If the speed of rotation of the electromechanical generator is increased beyond a certain value, when the vehicle is moving fast forward, the speed of rotation of the electromechanical generator is reduced by a braking mechanism as shown in block 160. The flywheel connected with a shaft of the electromechanical generator may also store mechanical energy of rotation as in block 162. When the vehicle is moving at slow speeds the stored mechanical energy is released by the flywheel for rotating the electromechanical generator to generate electricity as shown in block 164.

In use, the system disclosed herein could also be described as a method for generating electricity from a wind operated electricity generating system installed in a vehicle, the method comprising the steps of: (a) capturing a wind at a front portion of the vehicle through a front opening of a box portion when the vehicle is moving forward; (b) directing the captured wind flow through a plurality of turbine blades by a plurality of vanes attached to an interior portion of the housing; (c) rotating at least one turbine within the housing and at least one electromechanical generator positioned outside the housing to generate electricity; (d) exhausting the wind through a rear opening positioned at a rear portion of the vehicle; (e) transferring electricity generated by the electromechanical generator for charging at least one battery; (f) reducing speed of rotation of the electromechanical generator by a braking mechanism; (g) storing mechanical energy in a flywheel connected with a shaft of the electromechanical generator; and (h) releasing stored mechanical energy in the flywheel for rotating the electromechanical generator to generate electricity, wherein the plurality of turbine blades is rotated by a wind force generated by a movement of the vehicle in a forward direction. Optionally, the front opening may have a larger cross sectional area than an underside passage of the box portion for increasing the pressure of the wind. Optionally, the plurality of turbine blades may be positioned at the underside passage draws maximum power from the pressurized wind passing through the underside passage. Optionally, the battery may be operatively connected to the electromechanical generator.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent) even though not structurally equivalent to the disclosed component which performs the functions in the herein exemplary embodiments of the invention. In addition, while a particular feature of the invention may have been disclosed with respect to only one embodiment, such feature may be combined with one or more other features of other embodiments as may be desired or advantageous for any given or particular application.

I claim:

1. A wind powered electrical power generating system installed on a vehicle comprising:
 a box portion having a front opening, a rear opening and an inside compartment, the box portion being designed to be attached to the vehicle for utilizing a wind force generated during movement of the vehicle and wherein the box portion has a front compartment with the front opening and an underside passage and the rear opening near a rear end of the vehicle;
 at least one turbine having a plurality of blades rotatably mounted within the box portion;
 at least one electromechanical generator rotatably coupled with at least one turbine for converting turbine rotation into electrical energy;
 a plurality of vanes attached to the box portion to direct the wind towards the plurality of blades of the turbine; and
 an electrical connecting means to connect at least one electromechanical generator to at least one battery, whereby the front opening of the box portion allows the wind to pass through the at least one turbine which in turn rotates the at least one turbine and the at least one electromechanical generator to generate electrical energy.

2. The wind powered electrical power generating system of claim 1 wherein the front opening of the box portion is covered by a mesh screen to prevent foreign objects from getting trapped inside the box portion and wherein:
 a. the mesh screen is removably mounted in between the front opening and a bumper of the vehicle;
 b. the mesh screen comprises a heating element for heating and melting ice deposited on the mesh screen.

3. The wind powered electrical power generating system of claim 1 wherein the plurality of blades of each of the turbines radially extends from a central hub attached to a central axle, and wherein the central axle is mechanically coupled to a shaft of the electromechanical generator.

4. The wind powered electrical power generating system of claim 1 wherein the plurality of vanes directs the wind entering the box portion towards the plurality of blades of the turbine to achieve optimal power generation.

5. The wind powered electrical power generating system of claim 1 wherein the rear opening is adapted to discharge the wind.

6. The wind powered electrical power generating system of claim 1 wherein the turbine is mechanically engaged with the electromechanical generator by a first gear arrangement, and wherein the first gear arrangement has a variable gear ratio for adjusting speed of rotation of the electromechanical generator, and wherein the variable gear ratio of the first gear arrangement enables the electromechanical generator to produce electricity having predefined values when the vehicle is moving at very fast speeds and at slow speeds.

7. The wind powered electrical power generating system of claim 1 wherein the electromechanical generator is connected to the battery using the electrical connecting means having a circuitry for recharging the battery.

8. The wind powered electrical power generating system of claim 7 wherein the electromechanical generator has a flywheel attached to the shaft for storing mechanical energy when the turbine is in operation, and wherein the electromechanical generator is engaged with the flywheel by a second gear arrangement.

9. The wind powered electrical power generating system of claim 8 wherein the flywheel provides proper breaking to the electromechanical generator.

10. A wind powered electrical power generating system for improving fuel efficiency of a vehicle having a box portion comprising:
 a front opening, an underside passage and a rear opening forming an inside compartment, the box portion being designed to be attached to the vehicle for utilizing a wind force generated during movement of the vehicle;
 a plurality of turbines having a plurality of blades rotatably mounted within the box portion around a central hub attached to a central axle;
 at least one electromechanical generator rotatably coupled with the plurality of turbines using a first gear arrangement for converting turbine rotation into electrical energy;
 a plurality of vanes attached to an interior of the box portion to direct the wind towards the plurality of blades of the turbine;
 an electrical connecting means having a circuitry to connect at least one electromechanical generator to at least one battery; and
 a flywheel attached to a shaft of the electromechanical generator using a second gear arrangement for braking the generator, wherein the flywheel is operatively engaged with the electromechanical generator for storing mechanical energy when excess energy is provided by the turbine to the electromechanical generator and releasing energy when inadequate energy is provided by the turbine to the electromechanical generator.

11. The wind powered electrical power generating system of claim 10 wherein the front opening has a substantially greater cross section than the rear opening at a rear portion of the vehicle.

12. The wind powered electrical power generating system of claim 10 wherein the plurality of turbines is placed inside the box portion, each of the turbines is adapted to be operated by the wind passing through the interior of the box portion when the vehicle is in motion, and wherein the electromechanical generator is positioned outside the box portion.

13. The wind powered electrical power generating system of claim 10 wherein the electromechanical generator is operatively engaged with the plurality of turbines.

14. The wind powered electrical power generating system of claim 10 wherein the plurality of blades of the plurality of turbines is attached to the central hub and the central axle, the central axle is mechanically coupled to the shaft of the electromechanical generator.

15. The wind powered electrical power generating system of claim 10 wherein the electromechanical generator provides electrical energy for charging the at least one battery when the turbine is in operation.

16. The wind powered electrical power generating system of claim 10 wherein the plurality of vanes is attached to a floor and a ceiling of the interior of the box portion.

17. The wind powered electrical power generating system of claim 10 wherein the first gear arrangement includes a plurality of gear assembly that controls the electromechanical generator speed when the vehicle moves at high speeds and at low speeds.

18. The wind powered electrical power generating system of claim 10 wherein the flywheel engages the electromechanical generator to reduce speed and electric power generation under safe limits when the vehicle is moving at high speeds.

19. The wind powered electrical power generating system of claim 10 wherein the floor of the box portion includes a plurality of small openings to drain out water that may enter the system.

* * * * *